United States Patent
Zhang et al.

(10) Patent No.: US 10,127,808 B2
(45) Date of Patent: Nov. 13, 2018

(54) INFRARED LEARNING DEVICE

(71) Applicant: REALTEK SEMICONDUCTOR CORP., Hsinchu (TW)

(72) Inventors: Jie Zhang, Jiangsu (CN); Shin-Yo Lin, Taoyuan (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 31 days.

(21) Appl. No.: 15/633,052

(22) Filed: Jun. 26, 2017

(65) Prior Publication Data
US 2018/0144620 A1   May 24, 2018

(30) Foreign Application Priority Data
Jun. 23, 2016  (CN) .......................... 2016 1 0464127

(51) Int. Cl.
- *H04N 7/18* (2006.01)
- *H04N 5/44* (2011.01)
- *G08C 23/04* (2006.01)
- *G08C 17/02* (2006.01)
- *H04B 10/114* (2013.01)

(52) U.S. Cl.
CPC ............. *G08C 23/04* (2013.01); *G08C 17/02* (2013.01); *H04B 10/1141* (2013.01)

(58) Field of Classification Search
CPC ...... H04N 5/33; H04N 5/3651; H04N 5/4403; H04N 5/44; H04N 7/185; H04N 7/18; G08C 23/04; G08C 17/02; H04B 10/1141
USPC ................... 348/114, 734; 340/12.22–12.24; 455/151.1, 352
See application file for complete search history.

(56) References Cited

U.S. PATENT DOCUMENTS

| 2005/0046584 A1* | 3/2005 | Breed | ..................... B60C 11/24 340/13.31 |
| 2012/0200399 A1* | 8/2012 | Chae | ..................... G08C 21/00 340/12.22 |

* cited by examiner

*Primary Examiner* — Sherrie Hsia
(74) *Attorney, Agent, or Firm* — Li & Cai Intellectual Property (USA) Office

(57) ABSTRACT

An infrared (IR) learning device is disclosed. A hardware device of the IR learning device amplifies, shapes, and samples an IR signal to acquire a better digital signal related to the IR signal. A software device of the IR learning device calculates the waveform of the IR signal and the frequency of a carrier wave of the IR signal according to the digital signal related to the IR signal. Accordingly, the IR learning device can learn the IR signal emitted from an external device by the hardware device and the software device.

10 Claims, 6 Drawing Sheets

1

INFRARED LEARNING DEVICE

BACKGROUND

1. Technical Field

The present disclosure relates to an IR learning device, in particular, to an IR learning device which can learn a frequency and a waveform of an IR signal.

2. Description of Related Art

As technology advances, a conventional universal remote controller can be used to control various electronic devices. The conventional universal remote controller stores IR signals corresponding to electronic devices of different brands in advance. When a user controls the electronic devices of a specific brand with the conventional universal remote controller, the IR signal corresponding to the brand of the electronic device is transmitted to control the electronic device.

However, when the IR signal corresponding to a specific brand is not pre-stored in the conventional universal remote controller, the user will not be able to control the electronic device of the specific brand with the universal remote controller. Therefore, the universal remote controller can only control electronic devices of specific brands with IR signals, and cannot truly be universally applied to any electronic device.

SUMMARY

The invention is to provide an IR learning device. A hardware device of the IR learning device amplifies, shapes, and samples an IR signal to acquire a better digital signal related to the IR signal. Next, a software device of the IR learning device calculates the waveform of the IR signal and the frequency of a carrier wave of the IR signal according to the digital signal related to the IR signal. Accordingly, the IR learning device can learn the IR signal emitted from an external device by the hardware device and the software device.

An exemplary embodiment of the present disclosure provides an infrared (IR) learning device. The IR learning device is adapted for learning an IR signal emitted from an external device. The IR signal includes a carrier region having a carrier wave, and a no-carrier region. The IR learning device includes an IR transceiver, an amplifying and shaping circuit, a sampling circuit, and a processor. The IR transceiver is configured for receiving the IR signal. The amplifying and shaping circuit is coupled to the IR transceiver. The amplifying and shaping circuit is configured for amplifying and shaping the IR signal to generate a digital signal related to the IR signal. The sampling circuit is coupled to the amplifying and shaping circuit. The sampling circuit is configured for sampling the digital signal once every period, and performing a level switching record on the digital signal to generate a level switching time of a level conversion of the digital signal. The processor is coupled to the sampling circuit and the IR transceiver. The processor is configured for executing the following steps: determining whether a level switching time is received; when the level switching time is received, calculating a time interval between the two adjacent level switching times; accumulating the time interval in a carrier time of the carrier region or in a no-carrier time of the no-carrier region; and determining whether an end time has been reached. If the end time has not been reached, the processor returns to the step of determining whether the level switching time is received. When the end time has been reached, a waveform of the IR signal and a frequency of the carrier wave of the carrier region is calculated according to the carrier time, the no-carrier time, and a half-period number of the carrier wave.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
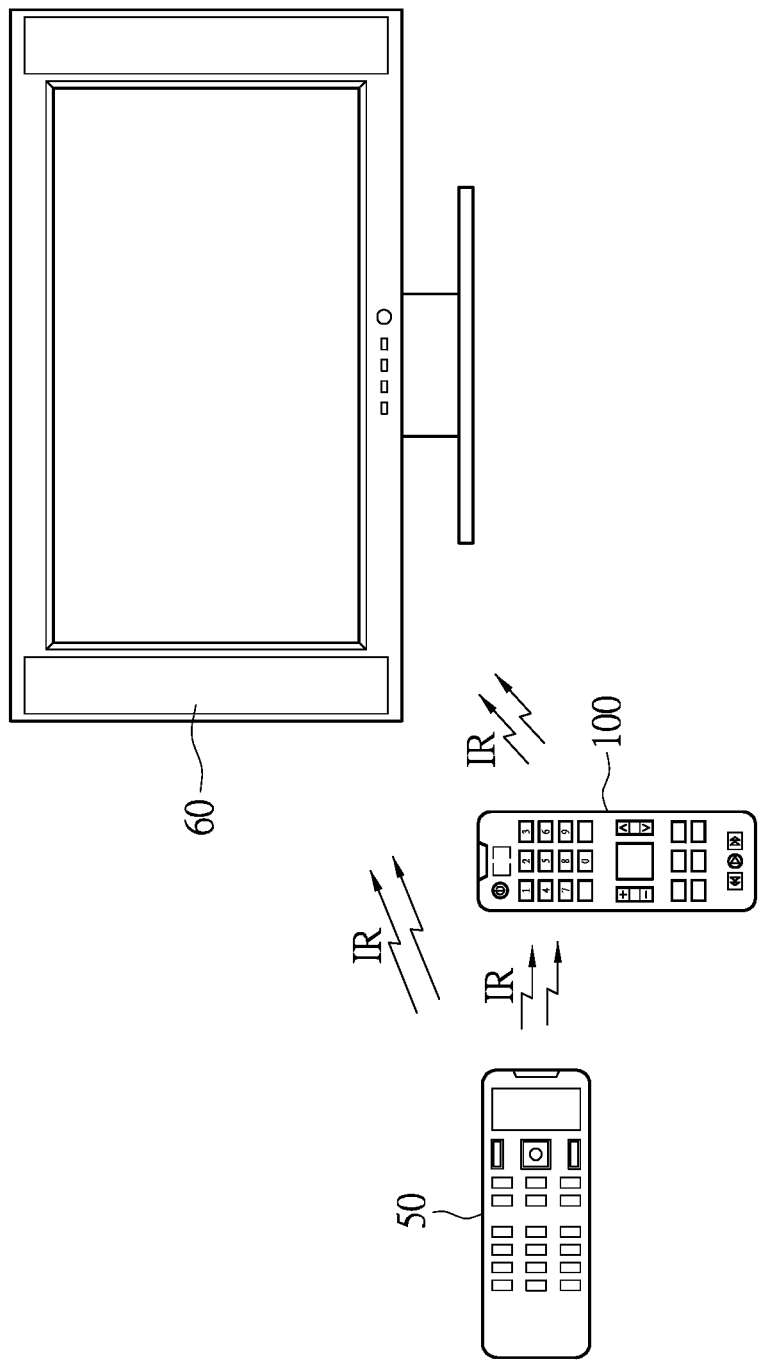
FIG. 1 shows a relation diagram among an external device, an IR learning device, and a controlled device according to an embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Firstly, please refer to FIG. 1, which shows the relation diagram among an external device, an infrared learning device, and a controlled device according to an embodiment of the present disclosure. As shown in FIG. 1, an external device 50 emits an infrared signal IR to control a controlled device 60. The infrared learning device 100 learns the infrared signal IR emitted from the external device 50. After the learning of the infrared signal IR is completed, the infrared learning device 100 can emit the same infrared signal IR as the external device 50 to control the controlled device 60. In the present disclosure, the external device 50 is a remote controller emitting the infrared signal IR with the specific frequency. The controlled device 60 is a liquid crystal display (LCD) TV. The LCD TV is controlled by the infrared signal IR with the specific frequency. In the present disclosure, the infrared learning device 100 is a universal remote controller that is used to integrate the infrared signals of the controlled device 60 and other controlled devices (not shown in FIGs). Therefore, the controlled device 60 and the other controlled devices may controlled by the infrared learning device 100 without using multiple remote controls.

It should be noted that the external device 50, the infrared learning device 100, and the controlled device 60 can be integrated into other electronic products and is not limited to that disclosed herein.

Figure 2:
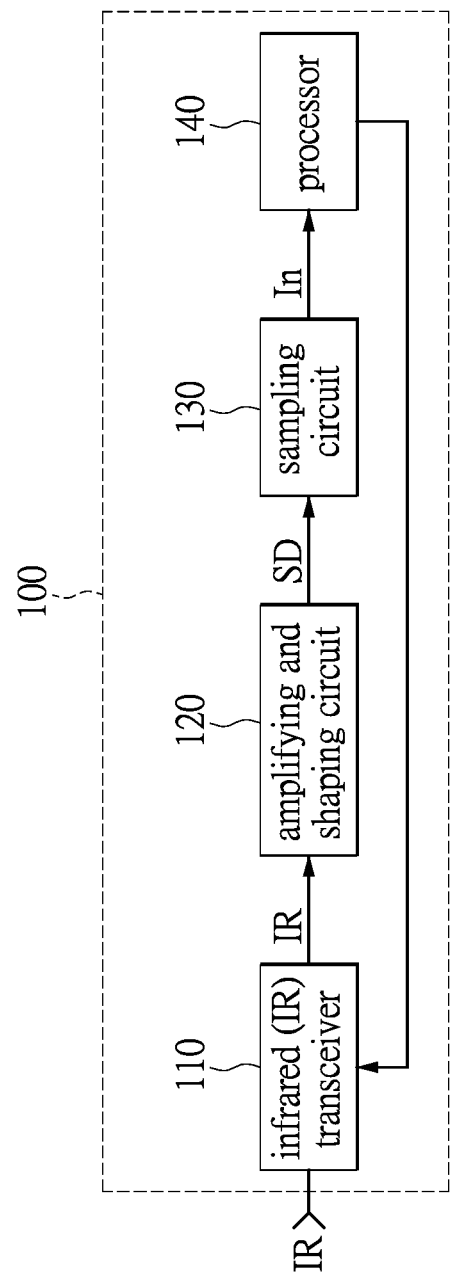
FIG. 2 shows a diagram of an IR learning device according to an embodiment of the present disclosure.
Figure 3:
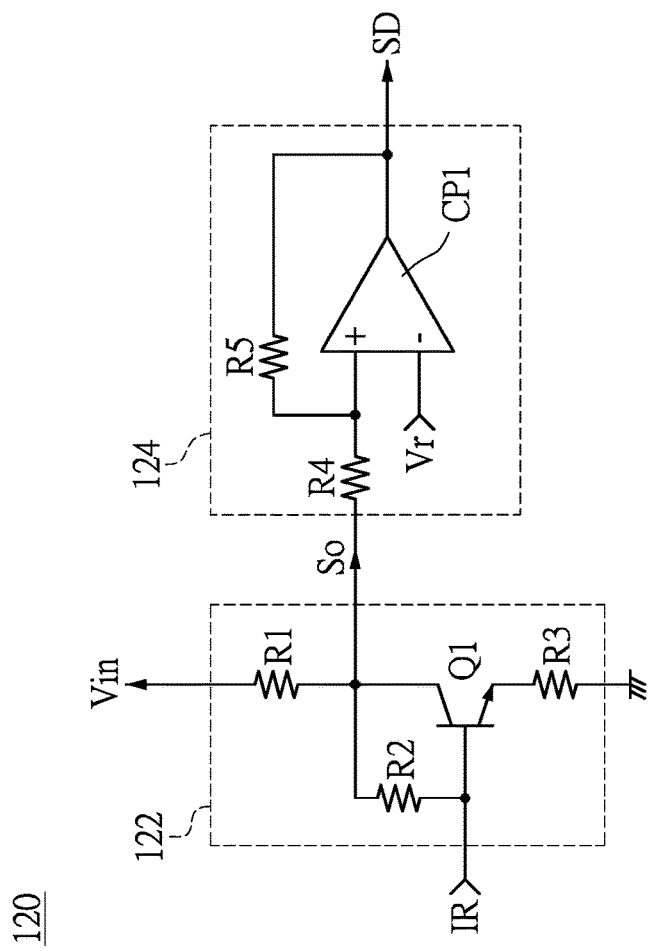
FIG. 3 shows a diagram of an amplifying and shaping circuit according to an embodiment of the present disclosure.

Next, please refer to FIG. 2, which shows the diagram of an IR learning device according to an embodiment of the present disclosure. As shown in FIG. 2, the infrared learning device 100 includes an infrared transceiver 110, an amplifying and shaping circuit 120, a sampling circuit 130, and a processor 140. The infrared transceiver 110 is coupled to the processor 140, and receives the infrared signal IR emitted from the external device 50.

In the present disclosure, the infrared transceiver 110 has a transition hole (not shown in FIGs). The processor 140 controls the infrared transceiver 110 transmitting or receiving the infrared signal IR. Therefore, when the processor 140 controlling the infrared transceiver 110 indicates a reception mode, the infrared transceiver 110 receives the infrared signal IR emitted from the external device 50 by the transition hole to learn the infrared signal IR.

Figure 6:
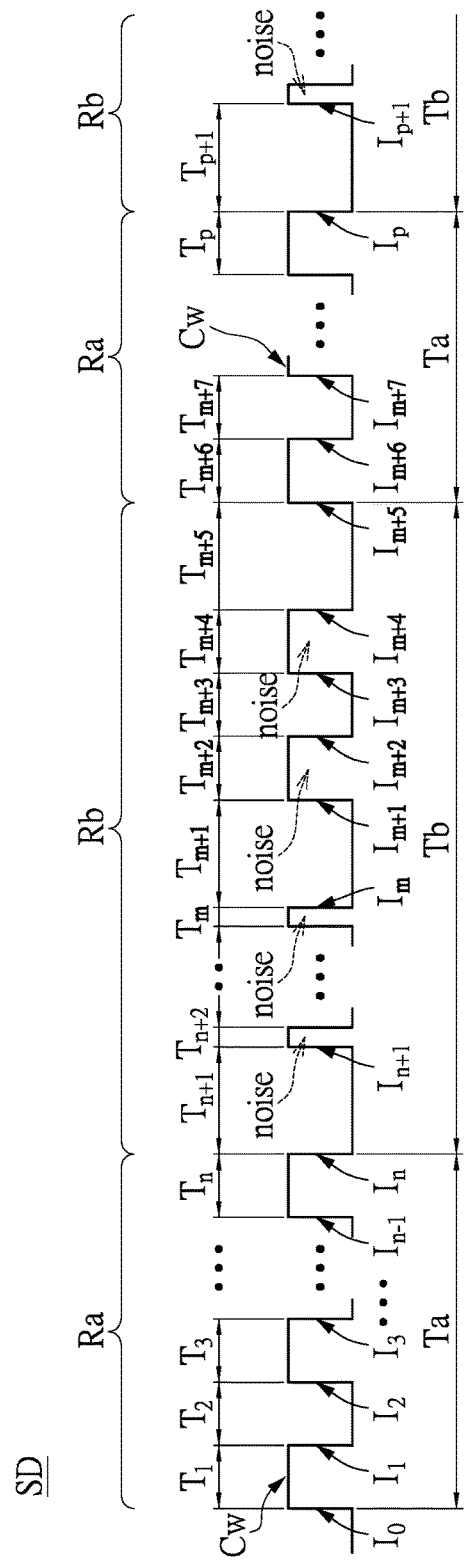
FIG. 6 shows a wave diagram of a digital signal according to an exemplary embodiment of the present disclosure.

The amplifying and shaping circuit 120 is coupled to the infrared transceiver 110. The received infrared signal IR is an analog signal. Therefore, the amplifying and shaping circuit 120 amplifies and shapes the infrared signal IR to generate a digital signal SD related to the infrared signal IR. Please refer to FIG. 6 in conjunction with FIG. 2. FIG. 6 shows a wave diagram of a digital signal according to an exemplary embodiment of the present disclosure. The digital signal SD is the infrared signal IR in digital form, and is a square-wave signal. The digital signal SD includes a carrier region Ra and a no-carrier region Rb. However, the noise may present in no-carrier region and may cause erroneous determination at receiving site. The carrier region Ra has a carrier wave Cw.

In the present disclosure, the amplifying and shaping circuit 120 includes an amplifying circuit 122 and a shaping circuit 124. The amplifying circuit 122 includes an NPN transistor Q1 and resistors R1, R2, R3. The collect end of the NPN transistor Q1 receives a voltage Vin through the resistor R1. The emit end of the NPN transistor Q1 is connected to the ground through the resistor R3. The base end of the NPN transistor Q1 receives the infrared signal IR. The resistor R2 is electrically connected between the base end and the collect end. Therefore, the NPN transistor Q1 amplifies the infrared signal IR according to the relationship among the resistors R1-R3, and then generates an infrared amplifying signal So to the shaping circuit 124.

The shaping circuit 124 includes a comparator CP1 and resistors R4 and R5. The non-inverting input end of the comparator CP1 is coupled to the collect end of the NPN transistor Q1 through the resistor R4 to receive the infrared amplifying signal So. The resistor R5 is electrically connected between the non-inverting input node of the comparator CP1 and the output end of the comparator CP1. The inverting input node of the comparator CP1 receives a reference voltage Vr. Therefore, the comparator CP1 compares the infrared amplifying signal So and the reference voltage Vr, to shape the infrared signal IR in the analog form into the digital signal SD. A person of ordinary skill in the art may also use other circuit architectures to form the amplifying and shaping circuit 120, and the present disclosure is not limited in this respect.

The amplified and shaped digital signal SD may be distorted, so that the duty cycle of each cycle is different. This may cause each of the digital signals SD to have at least one duty cycle. In order to avoid the occurrence of distortion, the amplifying and shaping circuit 120 is coupled to the sampling circuit 130. The sampling circuit 130 samples the digital signal SD once every period, and performs a level switching record on the digital signal SD to generate a level switching time when the digital signal SD has a level conversion. Since a person of ordinary skill in the art should be familiar with the periodical sampling of the digital signal SD, detailed description thereof is omitted. As shown in FIG. 6, the sampling circuit 130 generates level switching times $I0, I1, I2, I3 \ldots I_{n-1}, I_n, I_{n+1} \ldots I_m, I_{m+1}, I_{m+2}, I_{m+3}, I_{m+4}, I_{m+5}, I_{m+6}, I_{m+7} \ldots I_p, I_{p+1} \ldots$ of the digital signal SD to the processor 140.

Figure 4:
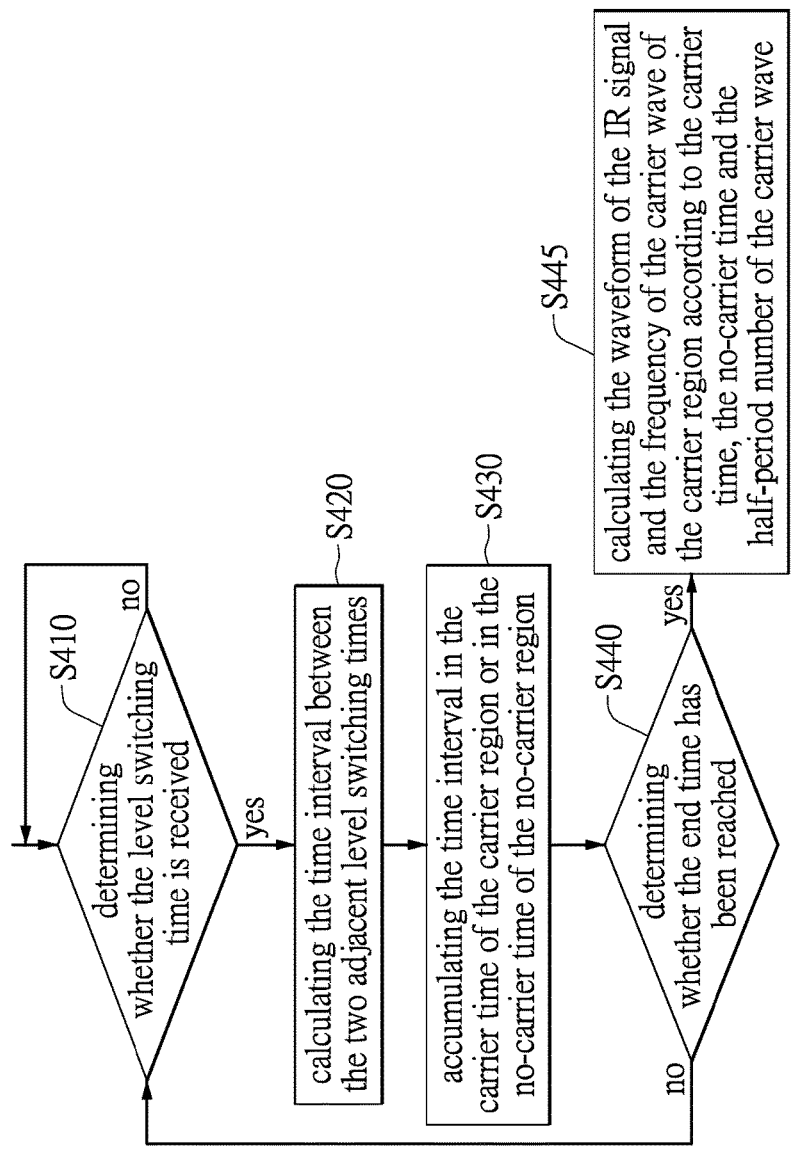
FIG. 4 shows a flowchart of a processor according to an embodiment of the present disclosure.

The processor 140 is coupled to the sampling circuit 130 and the infrared transceiver 110, and is configured for executing the following steps so as to learn the infrared signal IR according to the received level switching times. For the sake of convenience, the following description is based on the circumstance that the processor 140 ignores whether the infrared signal IR contains noise. Referring to FIGS. 4 and 6, firstly, the processor 140 determines whether the level switching time In transmitted from the sampling circuit 130 is received (step S410). If the processor 140 determines that the level switching time In has not been received, the processor 140 proceeds to re-determine whether the level switching time In has been received, i.e., returns to step S410.

When the processor 140 determines that the level switching time In is received, the processor 140 calculates a time interval between the two adjacent level switching times In (step S420). For example, when the processor 140 determines that the level switching time I1 is received, the processor 140 calculates the time interval T1 between the two adjacent level switching times I1 and I0. When the processor 140 determines that the level switching time I2 is received, the processor 140 calculates the time interval T2 between the two adjacent level switching times I2 and I1.

Figure 5:
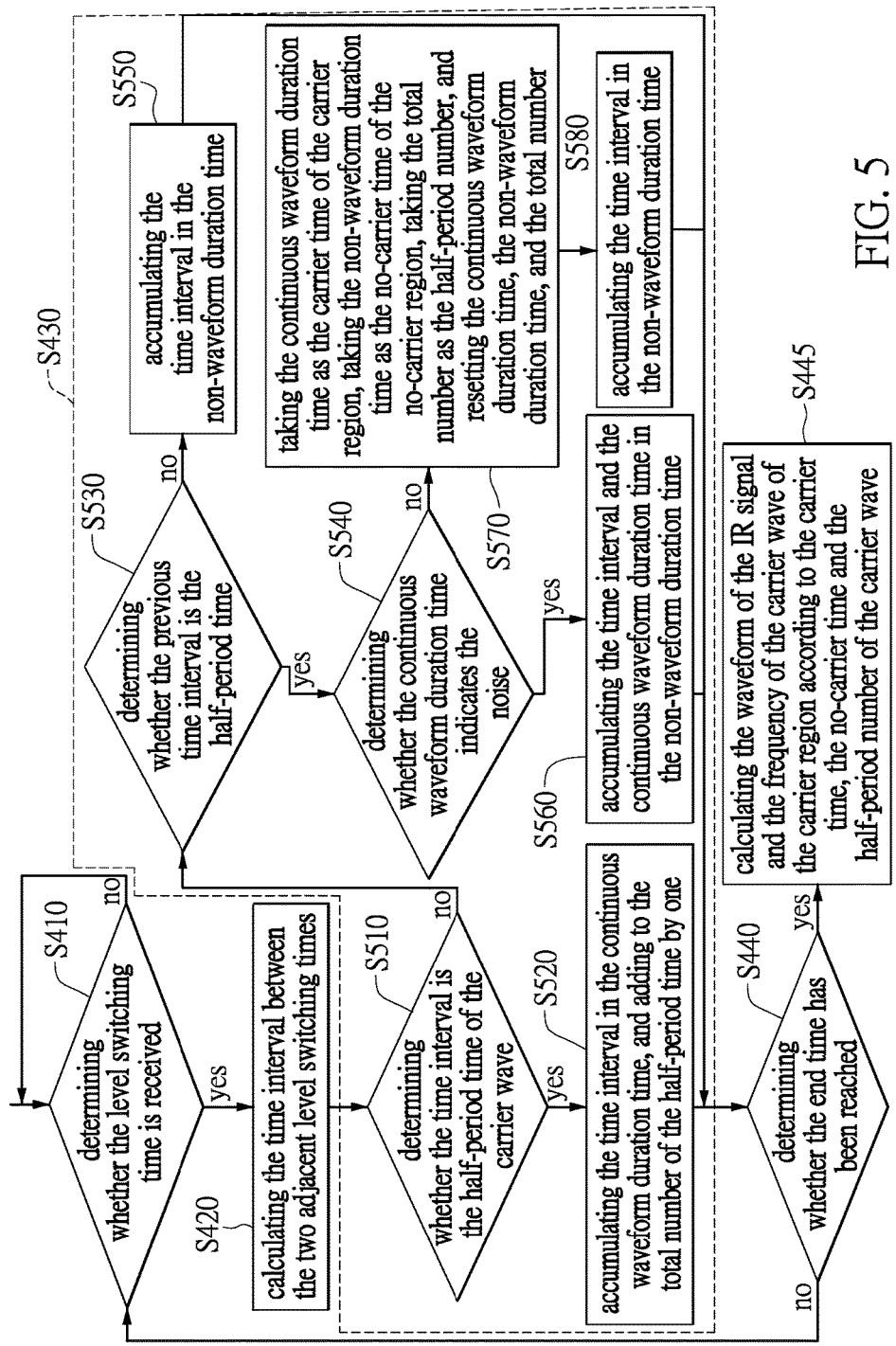
FIG. 5 shows a detailed flowchart of step S430 according to an embodiment of the present disclosure.

The processor 140 then accumulates the time interval in the carrier time Ta of the carrier region Ra or accumulates the time interval in the no-carrier time Tb of the no-carrier region Rb (step S430). More specifically, please refer to FIG. 5, which shows a detailed flowchart of step S430 according to an embodiment of the present disclosure. As shown in FIG. 5, after the processor 140 calculates the time interval between the two adjacent level switching times In, the processor 140 determines whether the time interval indicates a half-period time of the carrier wave Cw to accordingly determine whether the signal of the time interval should be located in the carrier region Ra or in the no-carrier region Rb (step S510). In the present disclosure, the half-period time of the carrier wave Cw is a predefined time interval, e.g., 30-40 ms.

When the processor 140 determines that the time interval indicates the half-period time of the carrier wave Cw, the processor 140 accumulates the time interval in a continuous waveform duration time, and adds to a total number of the half-period times by one (step S520). It is worth noting that, in the carrier region Ra, the half-period time of the carrier wave Cw is usually 30-40 ms. However, in the no-carrier region Rb, the time interval may be close to the half-period time of the carrier wave Cw. Therefore, the continuous waveform duration time may appear in the carrier region Ra or in the no-carrier region Rb. For example, as shown in FIG. 6, when the processor 140 determines that the level switching time I3 is received, the processor 140 calculates the time interval T3 between the two adjacent level switching times I3 and I2, and determines whether the time interval T3 is a half-period time of the carrier wave Cw. When the processor 140 determines that the time interval T3 (e.g., 35 ms) is the half-period time (e.g., 30-40 ms) of the carrier wave Cw, the processor 140 accumulates the time interval T3 in the continuous waveform duration time, and adds to a total number of the half-period times by one.

When the processor 140 determines that the time interval is not the half-period time of the carrier wave Cw, the processor 140 further determines whether the previous time interval is the half-period time of the carrier wave Cw (step S530). When the processor 140 determines that the previous time interval is not the half-period time of the carrier wave Cw, it indicates that the time interval is in the no-carrier region Rb. At this time, the processor 140 accumulates the time interval in a non-waveform duration time (step S550). The non-waveform duration time appears in the no-carrier region Rb. With the time interval Tn+2 of FIG. 6 as an example, when the processor 140 determines that the previous time interval $T_{n+1}$ is not the half-period time of the carrier wave Cw, it indicates that the time interval $T_{n+2}$ is in the no-carrier region Rb. The processor 140 accumulates the time interval $T_{n+2}$ in the non-waveform duration time.

When the processor 140 determines that the previous time interval is the half-period time of the carrier wave Cw, the processor 140 further determines whether the continuous waveform duration time indicates a noise (step S540). In the present disclosure, when the continuous waveform duration time is less than a predefined time (e.g., 300 ms), the processor 140 determines that the continuous waveform duration time indicates the noise. Conversely, when the continuous waveform duration time is more than or equal to the predefined time, the processor 140 determines that the continuous waveform duration time does not indicate the noise. At this time, the continuous waveform duration time indicates the carrier time Ta of the carrier region Ra. When the processor 140 determines that the continuous waveform duration time indicates the noise, it indicates that the continuous waveform duration time is in the no-carrier region Rb. At this time, the processor 140 accumulates the time interval and the continuous waveform duration time in the no-carrier time Tb (step S560). As shown in FIG. 6, under the exemplary conditions that the time interval is $T_{m+5}$, the accumulated continuous waveform duration time is 150 ms, and the predefined time is 300 ms, when the processor 140 determines that the previous time interval $T_{m+4}$ is the half-period time of the carrier wave Cw, the processor 140 further determines that the continuous waveform duration time indicates the noise (i.e., determines that the continuous waveform duration time (150 ms) is less than the predefined time (300 ms)), it indicates that the time interval $T_{m+5}$ and the accumulated continuous waveform duration time are in the no-carrier region Rb. At this time, the processor 140 accumulates the time interval $T_{m+5}$ and the accumulated continuous waveform duration time in the no-carrier region Rb. Accordingly, when there is the noise in the no-carrier region Rb, the processor 140 can remove the interference from the noise.

If the processor 140 determines that the continuous waveform duration time does not indicate the noise, it indicates that the continuous waveform duration time is the carrier time Ta of the carrier region Ra. At this time, the processor 140 takes the continuous waveform duration time as the carrier time Ta of the carrier region Ra, takes the non-waveform duration time as the no-carrier time Tb of the no-carrier region Rb, takes the total number as the half-period number of the carrier wave Cw, and resets the continuous waveform duration time, the non-waveform duration time, and the total number (step S570). After resetting the continuous waveform duration time, the non-waveform duration time, and the total number, the processor 140 accumulates the time interval in the non-waveform duration time to re-accumulate the no-carrier time Tb of the next period (step S580).

As shown in FIG. 6, under the exemplary conditions that the time interval is $T_{n+1}$, the accumulated continuous waveform duration time is 560 ms, and the predefined time is 300 ms as an example, when the processor 140 determines that the previous time interval Tn is the half-period time of the carrier wave Cw, the processor 140 further determines that the continuous waveform duration time does not indicate the noise (i.e., determining that the continuous waveform duration time (560 ms) is more than or equal to the predefined time (300 ms)), indicating that the continuous waveform duration time is the carrier time Ta. At this time, the processor 140 takes the continuous waveform duration time as the carrier time Ta of the carrier region Ra, takes the non-waveform duration time as the no-carrier time Tb of the no-carrier region Rb, takes the total number as the half-period number, and then resets continuous waveform duration time, the non-waveform duration time, and the total number. Next, the processor 140 accumulates the time interval $T_{n+1}$ in the non-waveform duration time to re-accumulate the no-carrier time Tb of the next period.

After the step S520, S550, S560, and S580, the processor 140 further determines whether an end time is reached to accordingly determine whether to end the infrared learning (step S440). In the present disclosure, the end time can be set according to the actual condition of the digital signal SD to ensure that the processor 140 has acquired all waveforms and frequencies within one period of the digital signal SD. Therefore, when the processor 140 determines that the end time (e.g., 2000 ms) has not been reached, the processor 140 returns to the step of determining whether the level switching time In is received, i.e., returns to step S410. Conversely, when the processor 140 determines that the end time (e.g., 2000 ms) has been reached, the processor 140 ends the infrared learning (step S445). At this time, the processor 140 calculates the waveform of the infrared signal IR and the frequency of the carrier wave Cw of the carrier region Ra according to the carrier time Ta, the no-carrier time Tb, and the half-period number of the carrier wave Cw. More specifically, the processor 140 generates the carrier time Ta of the carrier region Ra and the no-carrier time Tb of the no-carrier region Rb. The processor 140 takes the carrier time Ta and the carrier time Tb as the waveform of the infrared signal and takes the half-period number of the carrier wave Cw as the frequency of the carrier wave Cw of the carrier region Ra to complete the learning of the infrared signal IR accordingly.

Taking FIG. 6 as an example, FIG. 6 shows that the sampling circuit 130 transmits the level switching time to the processor 140, so that the processor 140 learns the infrared signal IR under the condition that the infrared signal IR has the noise. The half-period number of the carrier wave Cw is predefined to 30-40 ms. The end time is predefined to 2000 ms. In the digital signal SD, the time intervals $T_1 \sim T_n$ are 35 ms, the time interval $T_{n+1}$ is 150 ms, the time interval $T_{n+2} \sim T_m$ are 2.5 ms, the time interval $T_{m+1}$ is 150 ms, the time interval $T_{m+2} \sim T_{m+4}$ are 35 ms, the time interval $T_{m+5}$ is 150 ms, the time interval $T_{m+6} \sim T_p$ are 35 ms, and the time interval $T_{p+1}$ is 150 ms.

As shown in FIG. 6, the processor 140 firstly determines that the level switching time $I_0$ has been received. Since the processor 140 has not received other adjacent level switching times at this point, the time interval is 0 secs. The processor 140 determines that the time interval (i.e., 0 secs)

is not the half-period time (i.e., 30-40 ms) of the carrier wave Cw. Next, the processor 140 executes the steps S530 and S550 to accumulate the time interval (the present value is 0) in the non-waveform duration time. Since the end time (i.e., 2000 ms) has not been reached, the processor 140 returns to the step S410.

Next, the processor 140 determines that the level switching time $I_1$ is received, the processor 140 calculates the time interval $T_1$ between two adjacent level switching times $I_1$ and $I_0$, and determines that the time interval $T_1$ (i.e., 35 ms) is the half-period time (i.e., 30-40 ms) of the carrier wave Cw. The processor 140 then accumulates the time interval T1 (i.e., 35 ms) in the continuous waveform duration time, and adds to the total number of the half-period times by one. At this time, the accumulated continuous waveform duration time is the time interval T1 and the total number of the half-period time is 1. Since the end time (i.e., 2000 ms) has not been reached, the processor 140 returns to step S410.

Next, the processor 140 equally receives the level switching times $I_2, I_3 \ldots I_n$ to execute the steps S410, S420, S510, S520 and S440. At this time, the accumulated continuous waveform duration time is time intervals $T_1+T_2+T_3+ \ldots +T_n$, and the total number of the half-period times is n. Equally, since the end time (i.e., 2000 ms) has not been reached, the processor 140 returns to step S410.

Next, the processor 140 determines that the level switching time $I_{n+1}$ is received, the processor 140 calculates the time interval $T_{n+1}$ between the two adjacent level switching times $I_{n+1}$ and $I_n$, and determines that the time interval $T_{n+1}$ (i.e., 150 ms) is not the half-period time (i.e., 30-40 ms) of the carrier wave Cw. The processor 140 then determines that the previous time interval $T_n$ is the half-period time of the carrier wave Cw, and determines that the continuous waveform duration time does not indicate the noise. This means that the continuous waveform duration time is the carrier time Ta and the time interval Tn+1 is in the first no-carrier time Tb. At this time, the processor 140 takes the continuous waveform duration time (i.e., $T_1+T_2+T_3+ \ldots +T_n$) as the carrier time Ta of the carrier region Ra, takes the non-waveform duration time as the no-carrier time Tb of the no-carrier region Rb, takes the total number (i.e., the total number is n) as the half-period number of the carrier waveform Cw, and resets the continuous waveform duration time, the non-waveform duration time, and the total number. Next, the processor 140 accumulates the time interval $T_{n+1}$ in the non-waveform duration time to re-accumulate the no-carrier time Tb of the next period. Then, the processor 140 returns to the step S410.

Next, the processor 140 sequentially determines that the time intervals $T_{n+2} \ldots T_m, T_{m+1}$ are not the half-period time of the carrier wave Cw, and the previous time interval is not the half-period time, to sequentially accumulate the time intervals $T_{n+2} \ldots T_m, T_{m+1}$ in the non-waveform duration time. Then the processor 140 returns to the step S410.

Next, the processor 140 determines that the time intervals $T_{m+2}$-$T_{m+4}$ are the half-period time of the carrier wave Cw to sequentially accumulate the time intervals $T_{m+2}$-$T_{m+4}$ in the continuous waveform duration time, and to sequentially add to the total number of the half-period times (i.e., the total number is 3). Then the processor 140 returns to the step S410. Next, the processor 140 determines that the time interval $T_{m+5}$ (i.e., 150 ms) is not the half-period time of the carrier wave Cw, and that the previous time interval $T_{m+4}$ (i.e., 35 ms) is the half-period time (i.e., 30-40 ms). At this time, the processor 140 further determines that the continuous waveform duration time indicates the noise (i.e., determines that the continuous waveform duration time (105 ms) is less than the predefined time (300 ms)), and accumulates the time interval $T_{m+5}$ and the continuous waveform duration time in the non-waveform duration time. Then, the processor 140 returns to the step S410.

Next, the processor 140 receives the level switching times $I_{m+6}, I_{m+7} \ldots I_p$ to execute the steps S410, S420, S510, S520, and S440. At this time, the accumulated continuous waveform duration time is time intervals $T_{m+6}+T_{m+7}+ \ldots +T_p$, and the total number of the half-period times is (p)−(m+6). Then, the processor 140 returns to the step S410.

Next, the processor 140 determines that the time interval $T_{p+1}$ (i.e., 150 ms) is not the half-period time (i.e., 30-40 ms) of the carrier wave Cw. The processor 140 determines that the previous time interval $T_p$ is the half-period time of the carrier wave Cw and determines that the continuous waveform duration time does not indicate the noise. This means that the continuous waveform duration time is the carrier time Ta and the time interval $T_{n+1}$ is in the first no-carrier time Tb. At this time, the processor 140 takes the continuous waveform duration time (i.e., $T_{m+6}+T_{m+7}+ \ldots +T_p$) as the carrier time Ta of the carrier region Ra, takes the non-waveform duration time as the no-carrier time Tb of the no-carrier region Rb, takes the total number (i.e., the total number is n) as the half-period number of the carrier waveform Cw, and resets the continuous waveform duration time, the non-waveform duration time, and the total number. Next, the processor 140 accumulates the time interval $T_{n+1}$ in the non-waveform duration time to re-accumulate the no-carrier time Tb of the next period.

When the processor 140 determines that the end time (i.e., 2000 ms) has been reached, the processor 140 will complete the learning of the infrared signal IR. At this time, the processor 140 calculates a waveform of the infrared signal IR and a frequency of the carrier wave Cw of the carrier region Ra according to the carrier time Ta, the no-carrier time Tb, and a half-period number of the carrier wave Cw (i.e., at least one carrier time Ta, at least one no-carrier time Tb, and at least one half-period number of the carrier wave Cw). More specifically, the processor 140 takes the carrier time Ta of the carrier region Ra and the no-carrier time Tb of the no-carrier region Rb as the waveform of the infrared signal IR. The processor 140 also takes the half-period number of the carrier wave Cw to calculate the frequency of the carrier wave Cw of the carrier region Ra so as to complete the learning of the infrared signal IR.

After the learning of the infrared signal IR is completed, the infrared learning device 100 will have the same infrared signal IR as the external device 50. At this time, the processor 140 can control the infrared transceiver 110 and then transmit the infrared signal IR through the transition hole to remotely control the controlled device 60.

In summary, the invention is to provide the infrared learning device. The hardware device (i.e., the amplifying and shaping circuit and the sampling circuit) of the infrared learning device amplifies, shapes, and samples the infrared signal to acquire a better digital signal related to the infrared signal. Next, the software device (i.e., the processor) of the infrared learning device calculates the waveform of the infrared signal and the frequency of the carrier wave of the infrared signal according to the digital signal related to the infrared signal. Accordingly, the infrared learning device can learn the infrared signal emitted from the external device by the hardware device and the software device.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An infrared (IR) learning device, adapted for learning an IR signal emitted from an external device, the IR signal comprising a carrier region and a no-carrier region, the carrier region having a carrier wave, and the IR learning device comprising:
    an IR transceiver for receiving the IR signal;
    an amplifying and shaping circuit, coupled to the IR transceiver, for amplifying and shaping the IR signal to generate a digital signal related to the IR signal;
    a sampling circuit, coupled to the amplifying and shaping circuit, for sampling the digital signal once every period, and performing a level switching record on the digital signal to generate a level switching time while the digital signal having a level conversion; and
    a processor, coupled to the sampling circuit and the IR transceiver, for executing the following steps:
        determining whether the level switching time is received;
        when the level switching time is received, calculating a time interval between the two adjacent level switching times;
        accumulating the time interval in a carrier time of the carrier region or in a no-carrier time of the no-carrier region; and
        determining whether an end time has been reached, wherein returning to the step of determining whether the level switching time is received if the end time has not been reached; and calculating a waveform of the IR signal and a frequency of the carrier wave of the carrier region according to the carrier time, the no-carrier time and a half-period number of the carrier wave if the end time has been reached.

2. The IR learning device according to claim 1, wherein when determining that the level switching time is received, the processor re-determines whether the level switching time is received.

3. The IR learning device according to claim 1, wherein the step of accumulating the time interval in the carrier time of the carrier region or in the no-carrier time of the no-carrier region, further comprises:
    determining whether the time interval is a half-period time of the carrier wave;
    when the time interval is the half-period time of the carrier wave, accumulating the time interval in a continuous waveform duration time, and adding to a total number of the half-period times by one;
    when the time interval is not the half-period time of the carrier wave, determining whether the previous time interval is the half-period time;
    when the previous time interval is not the half-period time, accumulating the time interval in a non-waveform duration time, and when the previous time interval is the half-period time, determining whether the continuous waveform duration time indicates a noise;
    when the continuous waveform duration time indicates the noise, accumulating the time interval and the continuous waveform duration time in the non-waveform duration time, and when the continuous waveform duration time does not indicate the noise, taking the continuous waveform duration time as the carrier time of the carrier region, taking the non-waveform duration time as the no-carrier time of the no-carrier region, taking the total number as the half-period number, and resetting the continuous waveform duration time, the non-waveform duration time, and the total number; and
    after resetting the continuous waveform duration time, the non-waveform duration time, and the total number, accumulating the time interval in the non-waveform duration time.

4. The IR learning device according to claim 3, wherein when the continuous waveform duration time is less than a predefined time, the processor determines that the continuous waveform duration time indicates the noise.

5. The IR learning device according to claim 3, wherein when the continuous waveform duration time is more than or equal to a predefined time, the processor determines that the continuous waveform duration time does not indicate the noise.

6. The IR learning device according to claim 1, wherein the processor takes the carrier time of the carrier region and the no-carrier time of the no-carrier region as the waveform of the IR signal, and takes the half-period number of the carrier wave to calculate the frequency of the carrier wave of the carrier region.

7. The IR learning device according to claim 6, wherein the carrier time is less than the no-carrier time.

8. The IR learning device according to claim 6, wherein an upper half period of the carrier wave is equal to a lower half period of the carrier wave.

9. The IR learning device according to claim 1, wherein the IR transceiver has a transition hole, and the processor controls the IR transceiver transmitting or receiving the IR signal.

10. The IR learning device according to claim 1, wherein the digital signal is a square-wave signal, and the square-wave signal has at least one duty cycle.

* * * * *